(12) United States Patent
Wagoner et al.

(10) Patent No.: US 8,964,435 B2
(45) Date of Patent: Feb. 24, 2015

(54) METHODS AND SYSTEMS FOR OPERATING A POWER CONVERTER

(75) Inventors: Robert Gregory Wagoner, Roanoke, VA (US); David Smith, Daleville, VA (US); Anthony William Galbraith, Wirtz, VA (US)

(73) Assignee: General Electric Company, Schenectady, NY (US)

( * ) Notice: Subject to any disclaimer, the term of this patent is extended or adjusted under 35 U.S.C. 154(b) by 589 days.

(21) Appl. No.: 13/245,487

(22) Filed: Sep. 26, 2011

(65) Prior Publication Data

US 2013/0077372 A1 Mar. 28, 2013

(51) Int. Cl.
*H02M 7/537* (2006.01)
*H02J 3/38* (2006.01)
*H02M 1/00* (2006.01)

(52) U.S. Cl.
CPC .......... *H02J 3/383* (2013.01); *H02M 2001/007* (2013.01); *Y02E 10/563* (2013.01)
USPC ........................................ 363/131

(58) Field of Classification Search
USPC ............. 363/97, 98, 131, 132; 323/906, 266; 366/55, 56.01–56.12
See application file for complete search history.

(56) References Cited

U.S. PATENT DOCUMENTS

| | | |
|---|---|---|
| 5,801,519 A | 9/1998 | Midya et al. |
| 6,724,097 B1 | 4/2004 | Wobben |
| 2005/0110454 A1 | 5/2005 | Tsai et al. |
| 2007/0103108 A1 | 5/2007 | Capp et al. |
| 2010/0145533 A1 | 6/2010 | Cardinal et al. |
| 2010/0277002 A1* | 11/2010 | Folts et al. ............ 307/82 |
| 2011/0013432 A1 | 1/2011 | Wagoner |

OTHER PUBLICATIONS

Search Report and Written Opinion from corresponding PCT Application No. PCT/US2012/057307, dated May 17, 2013.
Barbosa et al., Novel Control Strategy for Grid-Connected DC-AC Converters with Load Power Factor and MPPT Control, Federal University of Rio de Janeiro, Department of Electrical Engineering, www.solar.coppe.ufrj, 13 pages.

* cited by examiner

*Primary Examiner* — Adolf Berhane
*Assistant Examiner* — Afework Demisse
(74) *Attorney, Agent, or Firm* — James McGinness, Esq.; Armstrong Teasdale LLP

(57) ABSTRACT

A power conversion system for providing power to an electrical grid is described. The power conversion system includes a power converter coupled to a photovoltaic (PV) array and configured to control a PV array voltage. The power conversion system also includes a system controller communicatively coupled to the power converter and configured to select from a first reduced power operating point and a second reduced power operating point when a power available from the PV array is greater than a rated output power of the power conversion system.

20 Claims, 4 Drawing Sheets

METHODS AND SYSTEMS FOR OPERATING A POWER CONVERTER

BACKGROUND OF THE INVENTION

The embodiments described herein relate generally to power generation, and more specifically, to methods and systems for operating a power conversion system.

Solar energy has increasingly become an attractive source of energy and has been recognized as a clean, renewable alternative form of energy. Solar energy in the form of sunlight may be converted to electrical energy by solar cells. A more general term for devices that convert light to electrical energy is "photovoltaic cells." Solar cells are a subset of photovoltaic (PV) cells.

In order to obtain a higher current and voltage, solar cells are electrically connected to form a solar module. In addition to a plurality of solar cells, the solar module may also include sensors, for example, an irradiance sensor, a temperature sensor, a voltage meter, a current meter, and/or a power meter. Solar modules may also be connected to form a module string. Typically, the direct current (DC) voltages output by the module strings are provided to a power converter, for example, a DC to alternating current (AC) voltage inverter. The DC to AC voltage inverter converts the DC voltage to three-phase AC voltage or current. The three-phase AC output from the DC to AC inverter is provided to a power transformer, which outputs a three-phase high-voltage AC power to an electrical grid.

In order to maximize the amount of time that an output power of a PV power generation system is at a desired level, it is common for the system to be designed with a PV array capable of producing more power than the power rating of the power converter. A "DC to AC ratio" is defined as the ratio of available power from the PV array divided by the rated output power of the power converter. For example, a particular system may have a DC to AC ratio of 1.25, where the ratio of available power from the PV array divided by the power converter rated output power is equal to 1.25. The rated output power of the power converter is typically selected to equal the power level desired to be provided to the electrical grid. A high DC to AC ratio is desirable because a system that includes a PV array having a higher available power than the converter rated output power maximizes the amount of time the output power level of the converter is at the desired level. However, a higher DC to AC ratio increases the chance of the power converter tripping or of converter damage.

BRIEF DESCRIPTION OF THE INVENTION

In one aspect, a power conversion system for providing power to an electrical grid is provided. The power conversion system includes a power converter coupled to a photovoltaic (PV) array and configured to control a PV array voltage. The power conversion system also includes a system controller communicatively coupled to the power converter and configured to select from a first reduced power operating point and a second reduced power operating point when a power available from the PV array is greater than a rated output power of the power conversion system.

In another aspect, a method for controlling operation of a power converter is provided. The method includes storing a rated output power of the power converter, determining an available power provided to the power converter, and selecting from a first reduced power operating point and a second reduced power operating point when the available power provided to the power converter is greater than the rated power of the power converter.

In yet another aspect, a system controller is provided. The system controller is coupled to, and configured to control operation of, a power converter coupled to a photovoltaic (PV) array and configured to control a PV array voltage. The system controller is configured to determine an available power provided by the PV array and select from a first reduced power operating point and a second reduced power operating point for the power converter when the available power is greater than a rated output power of the power converter.

DETAILED DESCRIPTION OF THE INVENTION

The methods and systems described herein facilitate maintaining a desired power output of a two-stage power converter when the desired power output is less than the power available from a photovoltaic (PV) array. The power converter is typically controlled using maximum power point tracking (MPPT) which utilizes a control algorithm to search for a maximum power point (MPP) to extract the maximum power available from the PV array. However, if the power available from the PV array exceeds the desired output power of the power converter, it is no longer desirable to operate the PV array at the maximum power point. To avoid tripping the power converter, the methods and systems described herein reduce the output power of the PV array to a level that matches the desired output power level of the converter plus converter losses. For example, the methods and systems described facilitate maintaining a power output of the two-stage power converter at a desired level when the power available from the PV array exceeds the desired level by either increasing a PV array direct current (DC) voltage or decreasing the PV array DC voltage.

By operating the power converter at a reduced power operating point, PV arrays with output power capability larger than the power converter rating may be utilized. This flexibility allows the power converter to be used with a wider range of PV arrays. This flexibility also allows operation of the power generation system over a wider range of operating conditions, such as cold weather, which causes the PV open circuit voltage to increase, and high irradiance, which causes the PV short circuit current to increase.

Technical effects of the methods and systems described herein include at least one of: (a) storing a rated output power of the power converter; (b) determining an available power provided to the power converter; and (c) determining a reduced power operating point when the available power provided to the power converter is greater than the rated power of the power converter.

Figure 1:
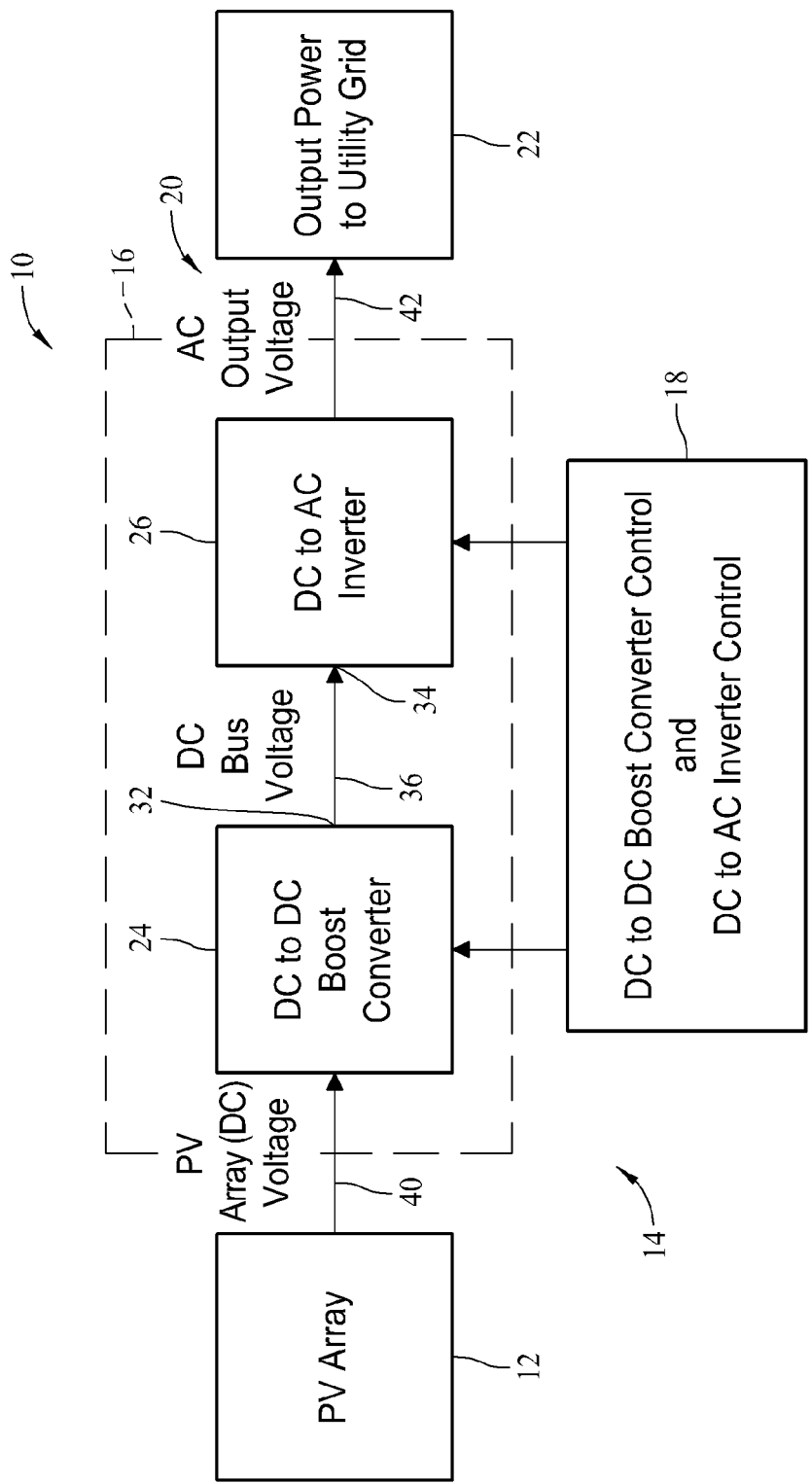
FIG. 1 is a block diagram of an exemplary embodiment of a photovoltaic (PV) power generation system.

FIG. 1 is a block diagram of an exemplary embodiment of a photovoltaic (PV) power generation system 10. In the exemplary embodiment, PV power generation system 10 includes a PV array 12 and a power conversion system 14. In the exemplary embodiment, power conversion system 14 includes a power converter 16, and a system controller 18. System 10 is configured to provide an alternating current (AC) output voltage 20 for delivery to a load, for example, but not limited to, a transformer or an electrical grid 22. Electrical grid 22 may include an electrical distribution grid, an electrical transmission grid, or any type of electrical grid configured for delivering electricity. PV array 12 includes at least one PV cell (not shown in FIG. 1), for example, at least one solar cell. Typically, a plurality of solar cells are coupled to form a solar array, also referred to as a solar module, and multiple solar modules are coupled to form a module string. The solar cells are arranged in this manner to increase the voltage and current output by the solar array. Although described herein as receiving power generated by PV array 12, two-stage power converter 16 may be provided with power from any suitable DC source that allows system 10 to function as described herein.

It should be noted that the embodiments described herein are not limited to any particular system controller and/or processor for performing the processing tasks described herein. The term "processor," as that term is used herein, is intended to denote any machine capable of performing the calculations, or computations, necessary to perform the tasks described herein. The term "processor" also is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of embodiments of the invention, as will be understood by those skilled in the art. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

In the exemplary embodiment, power converter 16 is a two-stage power converter that includes a DC to DC boost converter 24 and a DC to AC inverter 26. System controller 18 is configured to independently control operation of boost converter 24 and inverter 26. System controller 18 is configured to determine a power operating point that is provided to two-stage power converter 16 for controlling operation of two-stage power converter 16. For example, a maximum power point (MPP) may be determined by system controller 18 using a process referred to as maximum power point tracking (MPPT). System controller 18 provides a power operating point signal corresponding to the maximum power point to boost converter 24, and in response, boost converter 24 is configured to extract a maximum power available from PV array 12.

More specifically, a load resistance can be determined based on the voltage and current values determined to result in a maximum power output. For example, the voltage and current values correspond to a particular load resistance, which is equal to voltage divided by current. As such, system controller 18 controls the load resistance that boost converter 24 presents to PV array 12, and therefore, controls a PV array DC voltage. Controlling the load resistance facilitates controlling power output by boost converter 24. MPPT presents an optimal load resistance to PV array 12 such that power output by boost converter 24 is maximized. The optimal load resistance matches an impedance of PV array 12 allowing boost converter 24 to extract and output the maximum power available from PV array 12. The power operating point may also be adjusted to curtail PV array 12 (i.e., output less real power than is available). PV array 12 may be curtailed in order to reduce the power provided to electrical grid 22 in response to, for example, reduced energy demand or a grid event.

An output 32 of boost converter 24 is coupled to an input 34 of inverter 26 by at least one conductor, for example, a DC bus 36. PV array 12 is coupled to two-stage power converter 16 through at least one conductor 40, and inverter 26 is coupled to electrical grid 22 through at least one conductor 42. Although illustrated as single lines, conductor 40, conductor 42, and DC bus 36 may include any number of separate conductors that allows system 10 to function as described herein. For example, if PV power generation system 10 is a single phase system, conductor 40, conductor 42, and DC bus 36 may each include a single conductor. Alternatively, if PV power generation system 10 is a three phase system, conductor 40, conductor 42, and DC bus 36 may each include three separate conductors, one for each phase. Furthermore, PV power generation system 10 may include any suitable number of phases. A DC bus voltage is controlled by inverter 26, as it passes through whatever level of power is provided by boost converter 24. Inverter 26 also regulates the AC output current (real and reactive). More specifically, system controller 18 controls operation of inverter 26 to control the DC bus voltage and/or to control a power factor of AC voltage 20 output by inverter 26 and provided to electrical grid 22.

Figure 2:
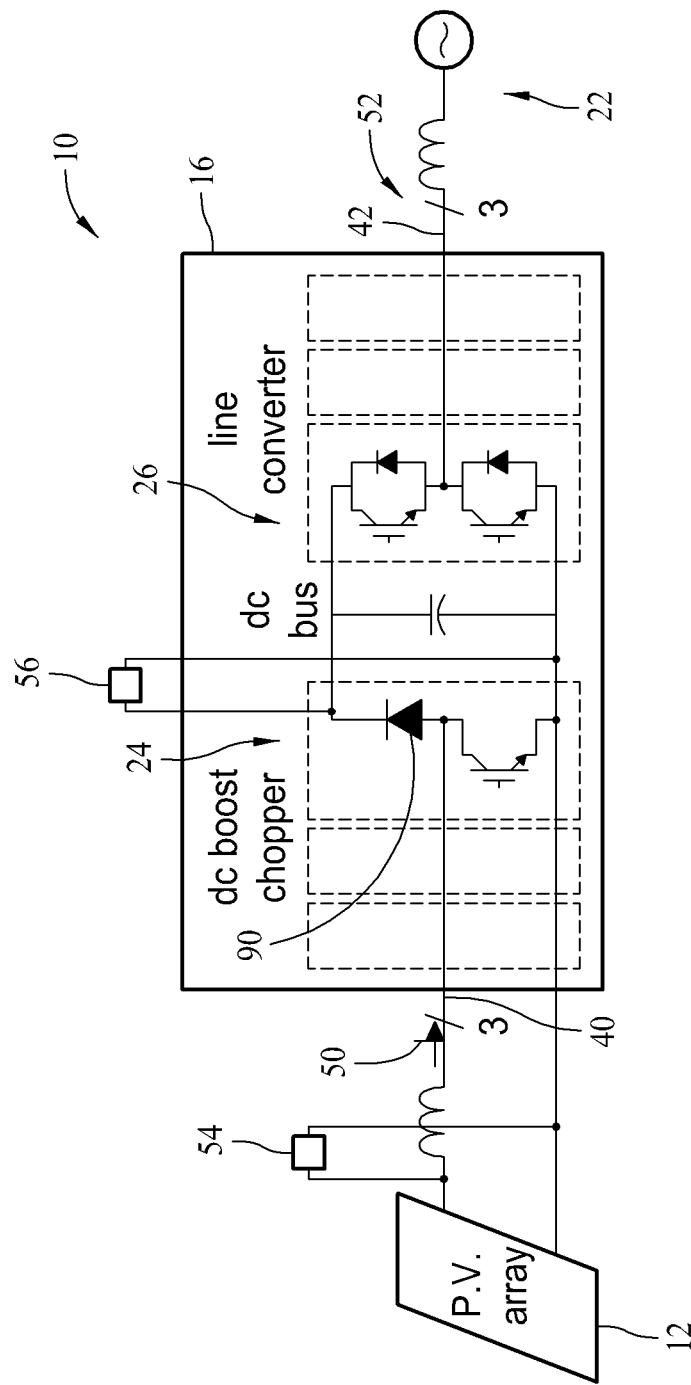
FIG. 2 is a circuit diagram of the PV power generation system shown in FIG. 1.

FIG. 2 is a circuit diagram of PV power generation system 10 (shown in FIG. 1). Components shared between FIGS. 1 and 2 are identified with identical reference numerals. In the exemplary embodiment, system 10 includes a plurality of current measurement devices 50 configured to measure a current flowing through conductor 40 (i.e., current input to power converter 16) and a plurality of current measurement devices 52 configured to measure a current flowing through conductor 42 (i.e., current output by power converter 16). System 10 also includes a PV voltage measurement device 54 configured to measure the PV array voltage level. Current measurement device 50 provides system controller 18 (shown in FIG. 1) with a PV array current signal corresponding to the measured PV array current. Voltage measurement device 54 provides system controller 18 with a PV array voltage signal corresponding to the measured PV array voltage level. System 10 also includes a DC bus voltage measurement device 56. DC bus voltage measurement device 56 provides system controller 18 with a DC bus voltage signal corresponding to the measured DC bus voltage.

Figure 3:
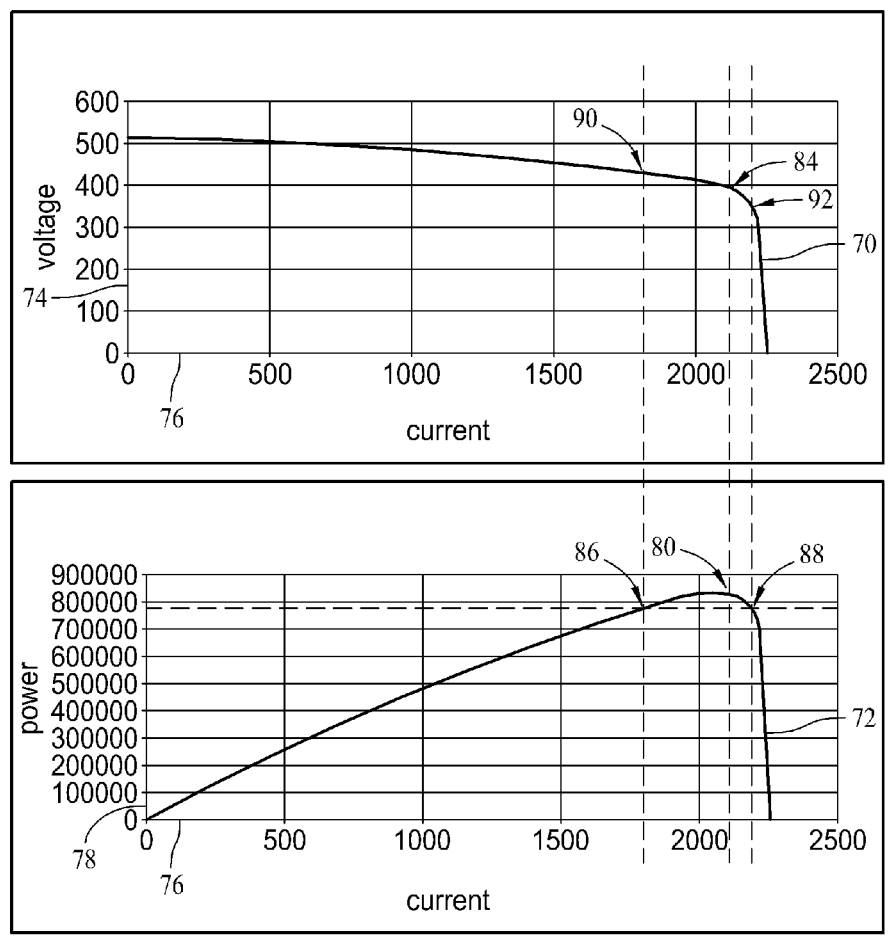
FIG. 3 is a plot of a typical PV array V-I curve and a typical PV array power curve at a particular temperature and irradiance.
Figure 4:
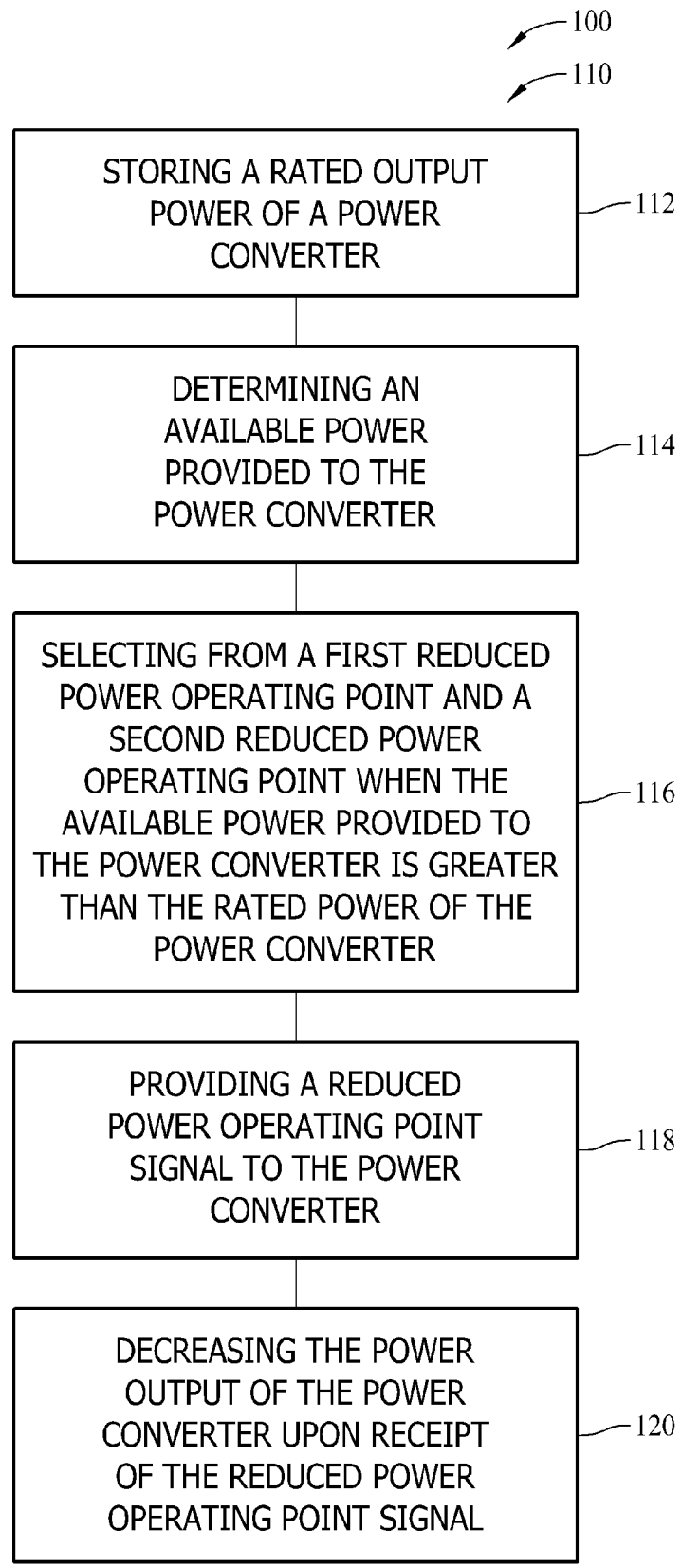
FIG. 4 is a flow chart of an exemplary method for controlling operation of the two-stage power converter shown in FIG. 1.

FIG. 3 is a plot of a typical PV array voltage-current curve (V-I curve) 70 and a typical PV array power curve 72 at a particular temperature and irradiance. V-I curve 70 compares a PV array DC voltage 74 to a PV array DC current 76. Power curve 72 compares power output 78 by boost converter 24 to PV array DC current 76. A maximum power operating point, identified generally at point 80, is determined by identifying a maximum power on power curve 72 and the corresponding voltage and current values from V-I curve 70, identified generally at a maximum power point 84. For a particular temperature and irradiance, PV array 12 has a single operating point that results in a maximum power output. PV array 12 has a V-I curve such that the maximum power point occurs at one particular voltage and current operating point. Maximum power point tracking utilizes a control algorithm to search for this maximum power point to extract the maximum power available from PV array 12. Two-stage converter 16 is configured to operate at maximum power operating point 80 in order to produce as much power as PV array 12 is able to produce for given conditions (e.g., given temperature and irradiance values).

However, at times it is not desirable to operate two-stage converter 16 at maximum power operating point 80. For example, when the DC to AC ratio of power generation system 10 is greater than one, in certain conditions (e.g., temperatures and irradiance available), operating at the MPP may cause power converter 16 to trip and/or be damaged. As referred to herein, a DC to AC ratio of power generation system 10 is the ratio of available power from PV array 12 (i.e., PV array size) divided by the rated output power of power converter 16. Therefore, in conditions where the maximum power available from PV array 12 is greater than the rated power of power converter 16, two-stage power converter 16 is configured to temporarily reduce the power received from PV array 12 so as to not exceed the rated power of power converter 16. In a specific example where power converter 16 is rated at 1 megawatt AC and PV array 12 is rated to provide 1.25 megawatt DC, the DC to AC ratio equals 1.25.

Alternate terminology for DC to AC ratio is DC to AC derate factor. As referred to herein, the DC to AC derate factor is the inverse of DC to AC ratio. For example, in a system with a power converter rating of 1 megawatt AC, if the PV array size is 1.25 megawatt DC, the DC to AC derate factor equals 1.0 megawatt AC divided by 1.25 megawatt DC, which equals 0.8.

In conditions where the available power from PV array 12 is greater than the power rating of power converter 16 there will be two possible operating points on PV array power curve 72 for a particular desired output power, for example, a first reduced power operating point 86 and a second reduced power operating point 88. As these operating points get closer to the rated power output of power converter 16, it becomes more likely that a transient will cause power converter 16 to trip and/or be damaged. As described above, customers desire the highest possible DC to AC ratio in order to maximize the amount of time the output power level of power converter 16 is at the rated power output. However, a high DC to AC ratio increases the chance of power converter 16 tripping or being damaged. Environmental conditions, including irradiance and ambient temperature are factors that determine the output power of PV array 12. For example, cold weather causes the PV open-circuit voltage to increase and high irradiance causes the PV short-circuit current to increase. Therefore, when the DC to AC ratio is greater than 1, in certain environmental conditions, PV array 12 may have the ability to provide more power to power converter 16 than power converter 16 is rated to handle.

Although the power output of PV array 12 is the same at first reduced power operating point 86 and second reduced power operating point 88, there are conditions that lead to selection of first or second operating point 86 or 88. A voltage and current corresponding to first reduced power operating point 86 are identified generally at point 90. A voltage and current corresponding to second reduced power operating point 88 are identified generally at point 92. On the high voltage side (i.e., first reduced power operating point 90), the factors are primarily the open circuit voltage of PV array 12 in low temperatures. The type of PV modules included within PV array 12 and the number of modules positioned in series dictate the open circuit voltage of PV array 12. The open circuit voltage is the highest voltage PV array 12 is able to output. In contrast, on the low voltage side (i.e., second reduced power operating point 92), the factors are primarily total short circuit current available from PV array 12 in high irradiance conditions. The type of PV modules included within PV array 12 and the number of modules positioned in parallel dictate the short circuit current of PV array 12. The short circuit current is the highest current PV array 12 is able to output.

In the exemplary embodiment, system controller 18 determines when conditions are such that power converter 16 be operated in a curtailed state. For example, system controller 18 may determine that conditions are such that power converter 16 should be operated in a curtailed state based on received current, voltage, and/or power measurements. In the exemplary embodiment, system controller 18 may determine that conditions are such that power converter 16 should be operated in a curtailed state when a PV power input to power converter 16 is greater than a rated output power of power converter 16. More specifically, system controller 18 may determine that if PV array 12 was to be operated at the MPP, that the power provided to power converter 16 from PV array 12 would exceed the rated power of power converter 16. Furthermore, system controller 18 may determine that conditions are such that power converter 16 should be operated in a curtailed state when a low voltage ride through (LVRT) grid event and/or a zero voltage ride through (ZVRT) grid event are detected. Alternatively, system controller 18 may determine that conditions are such that power converter 16 should be operated in a curtailed state based on a received curtailment signal. The curtailment signal may include a short term curtailment signal and/or a long term curtailment signal.

In the exemplary embodiment, system controller 18 determines a reduced power operating point for boost converter 24. System controller 18 may select from first reduced power operating point 86 and second reduced power operating point 88. Furthermore, system controller 18 provides a reduced power operating point signal to boost converter 24 that corresponds to the selected reduced power operating point. In response to the reduced power operating point signal, boost converter 24 decreases the power output of power converter 16 from a first power level (e.g., a power level associated with MPPT) to a second, lower power level.

In the exemplary embodiment, first reduced power operating point 86 corresponds to first reduced power operating point 90 on PV array V-I curve 70, which is on a high voltage side of maximum power point 84. Operating at first reduced power operating point 90 increases PV array voltage 74, which in turn, reduces a power output of power converter 16. For example, a sum of the power output 78 by power converter 16 and power losses in power converter 16 must be supplied by PV array 12. At first reduced power operating point 90, PV array voltage 74 is regulated at a level above a typical voltage, for example, above a voltage associated with maximum power point 84. Increasing the PV array voltage causes the PV array current to decrease.

In the exemplary embodiment, second reduced power operating point 88 corresponds to second reduced power operating point 92 on PV array V-I curve 70, which is on a low voltage side of maximum power point 84. Operating at second reduced power operating point 92 decreases PV array voltage 74, which in turn, reduces a power output of power converter 16. At second reduced power operating point 92, PV array voltage 74 is regulated at a level below a typical voltage, for example, below a voltage associated with maximum power point 84. Operating at a lower PV array voltage, and an accompanying higher PV array current, facilitates reducing the power output of power converter 16.

In the exemplary embodiment, system controller 18 determines which of first reduced power operating point 90 and second reduced power operating point 92 to operate boost converter 24 when conditions are such that power converter 16 be operated in a curtailed state. System controller 18 selects between first reduced power operating point 90 and second reduced power operating point 92 based on at least one of a rated power of power converter 16, a stored open circuit voltage of PV array 12, and a stored short circuit current of PV array 12.

More specifically, system controller 18 decreases the power output of power converter 16 by increasing the PV array voltage (i.e., selects first reduced power operating point 90) when an open circuit voltage of PV array 12 is less than a predefined voltage rating of power converter 16. The predefined voltage rating is selected to be less than a voltage that would cause protective devices included within power converter 16 to trip. For example, if the stored open circuit voltage of PV array 12 (i.e., the maximum voltage PV array 12 is capable of producing) is less than the predefined voltage rating of power converter 16, system controller 18 determines a reduced power operating point that includes a higher PV voltage than the PV voltage associated with maximum power operating point 80. This reduced power operating point is selected because even in extremely cold temperatures, the PV array voltage will not exceed levels that would cause tripping of protective devices within power converter 16.

When the stored open circuit voltage of PV array 12 is greater than the predefined voltage rating of power converter 16, the reduced power operating point is determined based on the short circuit current of PV array 12 and at least one current-based parameter of power converter 16. The short circuit current of PV array 12 is a predefined value representing the highest possible current that PV array 12 may output and is based on the configuration of PV array 12. Two parameters that may be determined based on the configuration of power converter 16 are a transient shorting limit and a continuous short circuit rating of boost converter 24. For example, boost converter 24 may have a transient shorting limit of 3600 amps DC and a continuous short circuit rating of 3000 amps DC. The transient shorting limit may be determined from a saturation limit of DC inductors included within boost converter 24. When evasive action (i.e., power reduction) is taken by increasing the PV array voltage, PV array 12 may be shorted through the DC inductors, however, the DC inductors must not saturate or tripping of protective devices within power converter 16 may occur.

In the exemplary embodiment, system controller 18 decreases the power output of power converter 16 by increasing the PV array voltage (i.e., selects first reduced power operating point 90) when the open circuit voltage of PV array 12 is greater than the predefined voltage rating of power converter 16 and a short circuit current of PV array 12 is between the transient shorting limit and the continuous short circuit rating of boost converter 24. More specifically, system controller 18 selects a reduced power operating point having a higher voltage and a lower current than maximum power operating point 84 (e.g., first reduced power operating point 90) when the open circuit voltage of PV array 12 is greater than the predefined tripping voltage of power converter 16 and the short circuit current of PV array 12 is greater than the continuous short circuit rating of boost converter 24. Operating power converter 16 at a reduced power operating point having a lower current increases the efficiency of converter 16 when compared to operating power converter 16 at a reduced power operating point having a higher current.

Furthermore, in the exemplary embodiment, system controller 18 decreases the power output of power converter 16 by decreasing the PV array voltage (i.e., selects second reduced power operating point 92) when the open circuit voltage of PV array 12 is greater than the predefined voltage and the short circuit current of PV array 12 is less than the continuous short circuit rating of boost converter 24. In these conditions, the current output by PV array 12 may be increased in order to reduce the power output of power converter 16 without exceeding the continuous short circuit rating of boost converter 24.

In the exemplary embodiment, system controller 18 returns power converter 16 to MPPT when the PV power input to power converter 16 is less than the rated output power of power converter 16. For example, system controller 18 may provide an MPP signal to boost converter 24 that corresponds to MPP 84 when the PV power input to power converter 16 is less than the rated output power of power converter 16.

FIG. 5 is a flow chart 100 of an exemplary method 110 for controlling operation of a power converter, for example, two-stage power converter 16 (shown in FIG. 1). Method 110 allows power converter 16 to be operated at two different points on a PV array V-I curve, for example, V-I curve 70 (shown in FIG. 3), depending upon the PV array design and operating conditions to improve the reliability and availability of power converter 16. In the exemplary embodiment, method 110 includes storing 112 a rated output power of power converter 16. The rated output power may be stored in a memory associated with system controller 18 and is typically equal to the output power to be provided to an electrical grid. The output power is typically agreed upon by an operator of power generation system 10 and an operator of the electrical grid.

Method 110 also includes determining 114 an available power provided to power converter 16. In the exemplary embodiment, the available power is the maximum power that may be provided by a PV array, for example, PV array 12 (shown in FIG. 1) when power converter 16 is operated at a maximum power point. For example, system controller 18 may determine 114 the available power based on a measurement of a PV array voltage and a PV array current.

Method 110 also includes selecting 116 from a first reduced power operating point, for example, first reduced power operating point 90 (shown in FIG. 3), and a second reduced power operating point, for example, second reduced power operating point 92 (shown in FIG. 3), when the available power provided to power converter 16 is greater than the rated power of power converter 16. As described above, operating at an MPP, for example, MPP 84 (shown in FIG. 3), may cause power converter 16 to trip and/or be damaged in conditions where the power provided to power converter 16 would be greater than the rated power of power converter 16 if operated at MPP 84. Therefore, when the DC to AC ratio is greater than one and conditions allow for high power production, two-stage power converter 16 is configured to temporarily reduce the PV array output power so as to not exceed the rated power of power converter 16.

For example, system controller 18 may select 116 first reduced power operating point 90 to decrease the power output of power converter 16 when an open circuit voltage of PV array 12 is less than a predefined voltage rating of power converter 16. As described above, first reduced power operating point 90 is a point on V-I curve 70 having a PV array voltage that is greater than a PV array voltage determined by MPPT.

Furthermore, system controller 18 may select 116 first reduced power operating point 90 to decrease the power output of power converter 16 when the open circuit voltage of PV array 12 is greater than the predefined voltage rating of power converter 16 and a short circuit current of PV array 12 is between a first predefined current level and a second predefined current level. The first and second predefined current levels are based on current ratings of boost converter 24 and the first predefined current level is greater than the second predefined current level.

Moreover, system controller 18 may select 116 second reduced power operating point 92 to decrease the power output of power converter 16 when the open circuit voltage of PV array 12 is greater than the predefined voltage rating of power converter 16 and the short circuit current of PV array 12 is less than the second predefined current level. As described above, second reduced power operating point 92 is a point on V-I curve 70 having a PV array voltage that is less than a PV array voltage determined by MPPT.

In the exemplary embodiment, method 110 may also include providing 118 a reduced power operating point signal corresponding to the selected reduced power operating point to power converter 16. In response to the reduced power operating point signal, power converter 16 adjusts the PV array voltage. For example, power converter 16 may receive the reduced power operating point signal, for example, at boost converter 24 (shown in FIG. 1).

In the exemplary embodiment, method 110 also includes decreasing 120 the power output of power converter 16 from a first power level corresponding to maximum power point operation of PV array 12 to a second power level upon receipt of the reduced power operating point signal. For example, boost converter 24 decreases 120 the power output of power converter 16 by increasing the PV array voltage upon receipt of a reduced power operating point signal associated with first reduced power operating point 90. Furthermore, boost converter 24 decreases 120 the power output of power converter 16 by decreasing the PV array voltage upon receipt of a reduced power operating point signal associated with second reduced power operating point 92.

Furthermore, one or more computer-readable media having computer-executable components, may be configured for controlling operation of a two-stage power converter. The computer-executable components may include: an interface component that, when executed by at least one processor, causes the at least one processor to receive a voltage measurement signal and a current measurement signal; a memory component that, when executed by at least one processor, causes the at least one processor to store at least one algorithm for determining PV array voltage commands corresponding to reduced power operating points; and an analysis component that, when executed by at least one processor, causes the at least one processor to generate operating signals that control operation of the two-stage power converter.

The embodiments described herein embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

The above-described embodiments facilitate efficient and cost-effective operation of a PV power generation system. The control system described herein controls operation of a two-stage power converter to facilitate operating a power generation system having a DC to AC ratio of greater than one. A system controller directs the power converter to go off MPPT anytime the desired power output of the inverter is less than the power available from the PV array at the MPP. By operating the power converter at a reduced power operating point, PV arrays with output power capability larger than the converter rating may be utilized, allowing the power converter to be used with a wider range of PV arrays, and facilitating operating the power generation system over a wider range of operating conditions, such as cold weather and high irradiance.

Exemplary embodiments of a power generation system that includes a two-stage power converter are described above in detail. The methods and systems are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conversion system for providing power to an electrical grid comprising:
   a power converter coupled to a photovoltaic (PV) array and configured to control a PV array voltage; and
   a system controller communicatively coupled to said power converter and configured to:
   determine a maximum power point of the PV array having a maximum power value and a maximum power point voltage; and
   select from a first reduced power operating point and a second reduced power operating point when a power available from the PV array is greater than a rated output power of said power conversion system, wherein:
   the first and second reduced power operating points include power values that are substantially identical and less than the maximum power value;

the first reduced power operating point selected based on at least one first condition and having a higher voltage than the maximum power point voltage; and the second reduced power operating point selected based on at least one second condition and having a lower voltage than the maximum power point voltage.

2. The system in accordance with claim 1, wherein said power converter comprises a boost converter and an inverter coupled to said boost converter by a direct current (DC) bus, said inverter configured to regulate a DC bus voltage.

3. The system in accordance with claim 1, wherein said system controller is further configured to provide a reduced power operating point signal corresponding to the selected reduced power operating point to said power converter, which in response to the reduced power operating point signal is configured to control the PV array voltage.

4. The system in accordance with claim 3, wherein said power converter is configured to decrease the power output of said power conversion system from the maximum power value to one of the first and second reduced power points upon receipt of the reduced power operating signal.

5. The system in accordance with claim 1, wherein the first reduced power operating point is a point on a voltage-current curve (V-I curve) associated with the PV array at a current temperature and irradiance, wherein the PV array voltage at the first reduced power operating point is greater than a PV array voltage determined by maximum power point tracking (MPPT).

6. The system in accordance with claim 1, wherein the second reduced power operating point is a point on a V-I curve associated with the PV array at a current temperature and irradiance, wherein the PV array voltage at the second reduced power operating point is less than a PV array voltage determined by MPPT.

7. The system in accordance with claim 1, wherein said system controller is further configured to select the first reduced power operating point to decrease the power output of said power conversion system when the first condition is one of:

an open circuit voltage of the PV array is less than a predefined voltage rating of said power conversion system; and the open circuit voltage of the PV array is greater than the predefined voltage rating and a short circuit current of the PV array is between a first predefined current level and a second predefined current level, wherein the first and second predefined current levels are based on current ratings of said power converter and the first predefined current level is greater than the second predefined current level.

8. The system in accordance with claim 7, wherein said system controller is further configured to select the second reduced power operating point to decrease the power output of said power conversion system when the second condition is the open circuit voltage of the PV array is greater than the predefined voltage rating and the short circuit current of the PV array is less than the second predefined current level.

9. A method for controlling operation of a power converter comprising:

storing a rated output power value of the power converter;
determining an available power provided to the power converter; and
selecting from a first reduced power operating point and a second reduced power operating point when the available power provided to the power converter is greater than the rated power value of the power converter, wherein:

the first and second reduced power operating points include power values that are substantially identical and less than the rated output power value of the power converter;

the first reduced power operating point selected based on at least one first condition and having a higher voltage than a maximum power point voltage; and the second reduced power operating point selected based on at least one second condition and having a lower voltage than the maximum power point voltage.

10. The method in accordance with claim 9, wherein the power converter is coupled to, and configured to receive power from, a photovoltaic (PV) array, and wherein determining an available power comprises receiving, at a system controller, a measurement of a PV array voltage and a PV array current.

11. The method in accordance with claim 10, further comprising providing a reduced power operating point signal corresponding to the selected reduced power operating point to the power converter.

12. The method in accordance with claim 11, wherein providing the reduced power operating point signal to the power converter comprises providing the reduced power operating point signal to a boost converter included within the power converter.

13. The method in accordance with claim 11, further comprising decreasing the power output of the power converter from a first power level corresponding to maximum power point operation of the PV array to a second power level upon receipt of the reduced power operating point signal.

14. The method in accordance with claim 13, wherein decreasing the power output of the power converter comprises controlling the PV array voltage in response to the reduced power operating point signal.

15. The method in accordance with claim 14, wherein selecting from the first reduced power operating point and the second reduced power operating point comprises selecting the first reduced power operating point to decrease the power output of the power converter when an open circuit voltage of the PV array is less than a predefined voltage rating of the power converter, wherein the first reduced power operating point comprises a point on a voltage-current curve (V-I curve) associated with the PV array having a PV array voltage that is greater than a PV array voltage determined by maximum power point tracking (MPPT).

16. The method in accordance with claim 14, wherein selecting from the first reduced power operating point and the second reduced power operating point comprises selecting the first reduced power operating point to decrease the power output of the power converter when the open circuit voltage of the PV array is greater than the predefined voltage rating of the power converter and a short circuit current of the PV array is between a first predefined current level and a second predefined current level, wherein the first and second predefined current levels are based on current ratings of the boost converter and the first predefined current level is greater than the second predefined current level.

17. The method in accordance with claim 16, wherein selecting from the first reduced power operating point and the second reduced power operating point further comprises selecting the second reduced power operating point to decrease the power output of the power converter when the open circuit voltage of the PV array is greater than the predefined voltage rating of the power converter and the short circuit current of the PV array is less than the second predefined current level, wherein the second reduced power operating point comprises a point on a V-I curve associated with the PV array having a PV array voltage that is less than a PV array voltage determined by MPPT.

18. A system controller coupled to, and configured to control operation of, a power converter coupled to a photovoltaic (PV) array and configured to control a PV array voltage, said system controller configured to:
   determine an available power provided by the PV array; and
   select from a first reduced power operating point and a second reduced power operating point for the power converter when the available power is greater than a rated output power of the power converter, wherein:
      the first and second reduced power operating points include power values that are substantially identical and less than the rated output power value of the power converter;
      the first reduced power operating point selected based on at least one first condition and having a higher voltage than a maximum power point voltage; and
      the second reduced power operating point selected based on at least one second condition and having a lower voltage than the maximum power point voltage.

19. The system controller in accordance with claim 18, further configured to provide a reduced power operating point signal corresponding to the selected reduced power operating point to the power converter, which in response to the reduced power operating point signal is configured to adjust the PV array voltage.

20. The system controller in accordance with claim 18, wherein the first reduced power operating point is a point on a voltage-current curve (V-I curve) associated with the PV array at a current temperature and irradiance, wherein the PV array voltage at the first reduced power operating point is greater than a PV array voltage determined by maximum power point tracking (MPPT), and wherein the second reduced power operating point is a point on a V-I curve associated with the PV array at a current temperature and irradiance, wherein the PV array voltage at the second reduced power operating point is less than a PV array voltage determined by MPPT.

* * * * *